Figure 1:
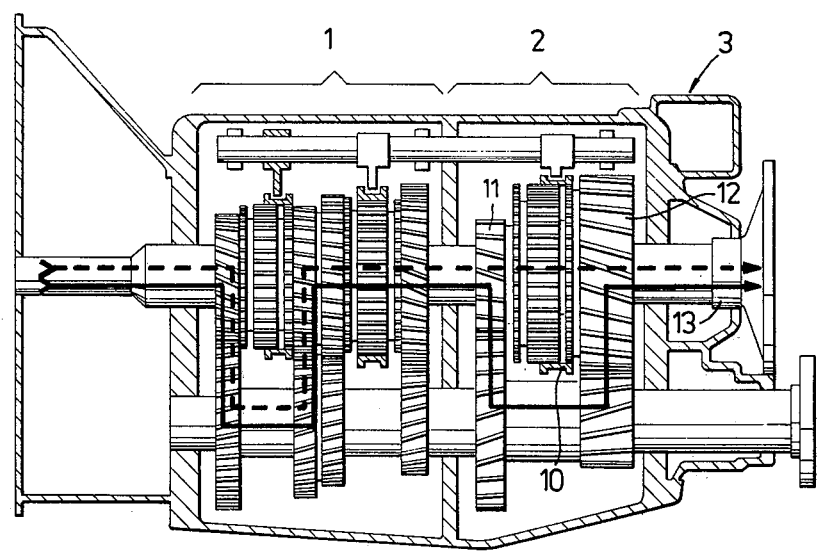

United States Patent [19]

Stromberg

[11] 3,939,722
[45] Feb. 24, 1976

[54] ARRANGEMENT FOR CONTROLLING GEAR CHANGES IN A MOTOR VEHICLE GEAR BOX

[75] Inventor: Jan Erling Gunnar Stromberg, Partille, Sweden

[73] Assignee: AB Volvo, Goteborg, Sweden

[22] Filed: Nov. 15, 1973

[21] Appl. No.: 416,093

[30] Foreign Application Priority Data
Nov. 17, 1972 Sweden............................ 14981/72

[52] U.S. Cl. ...................... 74/336; 74/861; 74/745
[51] Int. Cl.² ........................ F16H 5/60; F16H 3/02
[58] Field of Search ...... 74/745, 752 A, 336, 336.5, 74/335, 337, 861

[56] References Cited
UNITED STATES PATENTS

| | | | |
|---|---|---|---|
| 2,637,222 | 5/1953 | Backus............................... | 74/745 |
| 2,640,374 | 6/1953 | Willis................................. | 74/745 |
| 2,654,268 | 10/1953 | Perkins.............................. | 74/745 |
| 2,763,290 | 9/1956 | Perkins et al...................... | 74/745 X |
| 2,860,522 | 11/1958 | Howlett ............................. | 74/473 |
| 3,255,644 | 6/1966 | Warren et al...................... | 74/745 |
| 3,561,291 | 2/1971 | Webster et al.................... | 74/745 X |
| 3,640,152 | 2/1972 | Shirai et al........................ | 74/752 A |

Primary Examiner—Samuel Scott
Assistant Examiner—Lance W. Chandler
Attorney, Agent, or Firm—Young & Thompson

[57] ABSTRACT

Arrangement for controlling the shifting between two gear ratio ranges in a gear box for motor vehicles, said gear box comprising a main gear box with a number of gear ratios and a two-geared range gear box, coupled to the output shaft of the main gear box, the range gear box having such gear ratios that the total gear ratio of the gear box with the highest ratio in the range box and the lowest ratio in the main box is higher than that with the lower ratio in the range box and the highest ratio in the main box. The shifting in the main box is controlled by a manually operated gear lever and the shifting in the range box by a servo aggregate. The operation of the servo aggregate is controlled by a sensor device sensing the rpm of the output shaft of the range box and a control unit connected to the sensor device and adapted to give a signal for operation of the servo aggregate for shifting of the range box, when at least one predetermined rpm of the output shaft of the range box is passed while increasing or decreasing, means being provided to permit actuation of the servo aggregate only when, during shifting in the main box, the gear lever reaches the neutral position.

6 Claims, 5 Drawing Figures

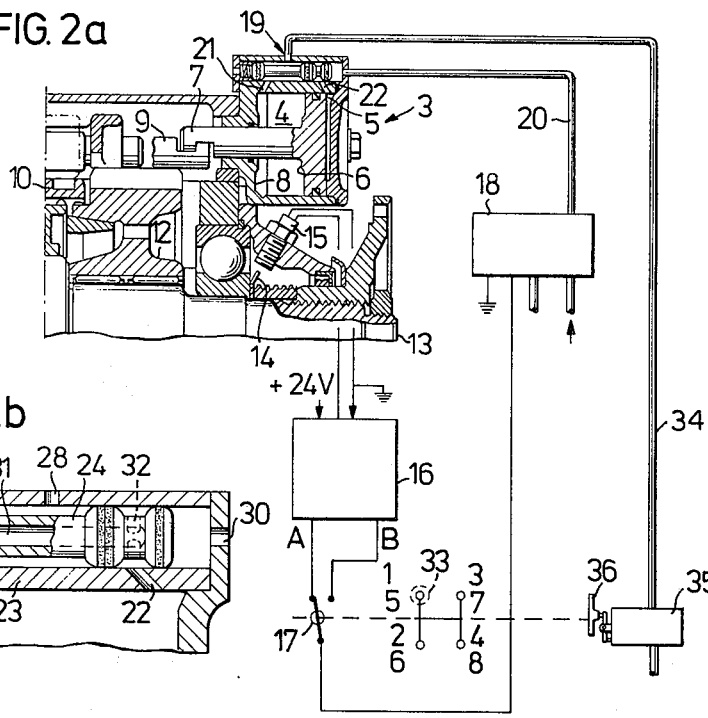
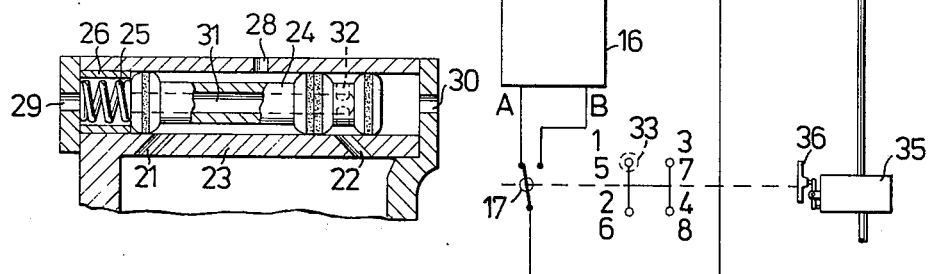
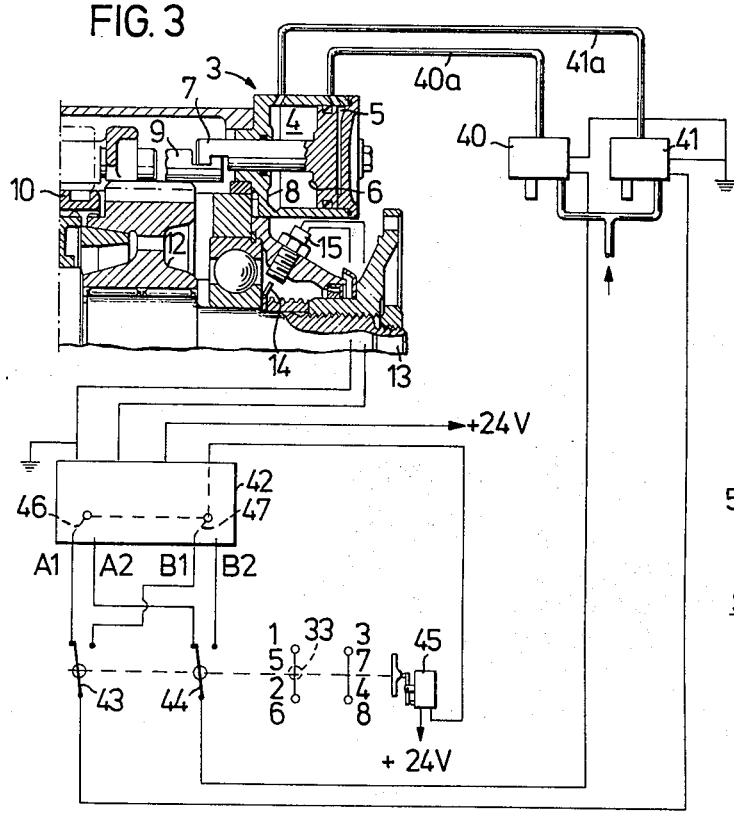
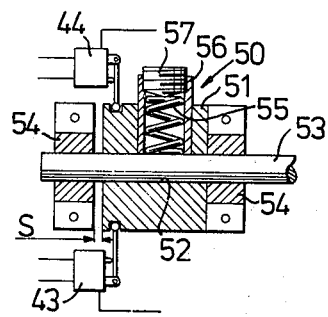

ARRANGEMENT FOR CONTROLLING GEAR CHANGES IN A MOTOR VEHICLE GEAR BOX

The present invention relates to an arrangement for controlling gear changes between two gear ratio ranges in a gear box which, preferably, is intended for use in heavy vehicles, said gear box comprising a main gear box having a plurality of ratios and a two-gear range gear box coupled to the driven shaft extending from the main gear box, said range gear box having such a gear ratio that the total gear ratio of the gear box with the higher ratio in the range gear box and the lowest ratio in the main box is higher than with the lower ratio in the range box and the highest ratio in the main box. Said arrangement comprises a servo-aggregate which is coupled to the gear-shifting mechanism of the range gear box and which is coordinated with means which only start operation of the servo-aggregate in connection with gear change in the main box, and a sensor device which is coordinated with the driven shaft extending from the range box for the purpose of sensing the shaft rpm.

It is usual in heavier load vehicles, which as a rule are provided with diesel engines, to have transmissions with eight and sometimes up to 16 gears forward to thereby be able to effectively exploit, in all positions, the diesel engine which only functions within a limited rpm range. For comfortable gear shifting a gear lever is arranged which has only a half or a fourth as many lever positions as the total number of gears in the gear box. The gear lever is coupled to the main gear box, while a separate operating means, e.g., a switch on the gear lever, is coupled to the range box.

In for example a transmission with a total of eight gears forward the main box has four gears with the lever positions in the conventional H-shape. The range box has two gears, thereby giving a doubling of the number of gears, and the operating means thus has only two positions. The position of the gear lever in fifth gear in this distribution is the same as in first gear, sixth gear is the same as second, etc.

In a known construction the operating means for the range box is mechanically coupled to a pneumatic pilot valve for shifting of the valve. The pilot valve guides air pressure to one side or the other of the piston in a piston-cylinder arrangement, which takes care of the shifting in the range box. In the connection between the compressed air source and the pilot valve there is also a stop valve, which is influenced by the longitudinal movement of the gear lever and can only be opened when the lever passes the neutral position.

With this arrangement it is possible, by shifting the operating means to pre-set the gear ratio of the range box. The actual gear change first occurs when the gear lever passes the neutral position and opens the stop valve and thereby the connection between the compressed air source and the piston cylinder arrangement via the pilot valve.

A disadvantage with this arrangement is that the driver must keep track of two operating means for shifting. It has occurred that the driver has forgotten to shift up the range box before shifting from fourth to fifth, and thus the driver has tried to shift into first gear. It is easy to see that this can easily lead to serious damage to the gear box and furthermore it is dangerous with regard to traffic safety.

Still more serious consequences result if the low range is chosen by mistake in, for example, shifting from eighth to seventh.

It is known, to avoid this disadvantage, to coordinate an inductive sensor with the driven shaft extending from the range box, which senses the rpm of the shaft. The sensor is coupled to a stop device for the gear lever, which locks the lever in the neutral position, when the rpm of the shaft exceeds a predetermined value in, for example, shifting from fourth to fifth and the range has not been shifted up. While it is true that this removes the risk of damage to the transmission due to mistakes in shifting gears, from the point of view of traffic safety it is a serious disadvantage because the driving force of the vehicle is lost when the gear lever is locked in the neutral position.

The present invention intends to remove the above mentioned disadvantages and achieve a device which automatically controls the shifting of the range box. This is achieved according to the invention by the sensor device being connected to an electronic control unit which is designed, when the rpm of the driven shaft exceeds or falls below at least one predetermined rpm, to give a signal for operation of the servo-aggregate for shifting of the range box when the main box is shifted.

With this arrangement the driver does not have to think about shifting an operating means in shifting from, for example, fourth to fifth. Rather, the servo-aggregate is shifted automatically with the help of the control unit in connection with the shifting of the main box when the shifting is done after the rpm of the driven shaft exceeds a certain value, this rpm being selected below the rpm at which shifting is usually done between fourth and fifth. The actual shifting can be initiated by means of said stop valve, influenced by the gear lever, when the lever passed the neutral position.

According to a preferred embodiment, the servo-aggregate consists of a pneumatically or hydraulically operated piston-cylinder arrangement and the control unit is electrically connected to at least one magnetic valve which regulates the supply of pressure medium to the piston-cylinder arrangement, the control unit being adjusted to open or close the magnetic valve depending on the rpm sensed by the sensor device.

According to a further development of the invention the control unit has two outputs, which are connected via a two-position change-over switch, which can be switched by the lateral movement of the gear lever in the neutral position, to the magnetic valve. The control unit is arranged so that it controls via the first output the current for shifting of the magnetic valve when the rpm of the driven shaft passes a first low rpm and via the second output when the rpm of the driven shaft passes a second higher rpm while increasing or decreasing. The first rpm is preferably chosen between the upper rpm limits for the second and third, and the second rpm is chosen between fourth and fifth. By choosing the second rpm higher than the upper rpm limit for fourth it is possible to quickly down shift from fifth to fourth without risk of shifting into eighth.

Additional characteristics and advantages of the invention will be evident from the following detailed description with reference to the examples shown in the accompanying drawings, in which FIG. 1 shows a side view of a gear box in simplified form with the housing cut away, illustrating the range gear box to the right and the main gear box to the left, FIG. 2a a partial cross section through the range box with the coupling diagram for the arrangement according to the invention, FIG. 2b the pilot valve in FIG. 2a in a larger scale, FIG. 3 a cross section corresponding to FIG. 2 with a circuit diagram for another embodiment of the invention and FIG. 4 shows a cross section through a device for transmitting the lateral movement of the gear lever to the change-over switches.

The gear box shown schematically in FIG. 1 comprises a four-geared main gear box 1 and two-geared range gear box 2 coupled to the driven shaft of the main box. The gearing of the range box 2 is chosen so that with the lower gear engaged one gets first to fourth gear and fifth to eight with the higher gear engaged. The shifting of the main gear box 1 is done in a conventional manner by means of a lever (not shown in the Figure). The shifting of the range box 2 is done by means of a servo-aggregate, indicated by 3, which is shown in FIGS. 2 and 3 in the form of a pneumatically operated piston-cylinder arrangement.

The piston-cylinder arrangement 3 is double-acting and has cylinder spaces 4 and 5 on either side on the piston 6. A piston rod 7 extends through an opening in the wall 8 of the space 4 and engages a longitudinally displaceable rod 9 in the gear shift mechanism of the range box 2. The movement of the rod is transmitted to a shift fork 10 for locking of one of the two gear wheels 11, 12 with the driven shaft 13 of the range box. In the position of the piston 6 shown the lower gear of the range box is engaged.

A toothed wheel 14 is attached to the driven shaft 13, and an inductive sensor 15 is placed right in front of it. The sensor is coupled electrically to an electronic control unit 16 and gives a pulsating current dependent on the rpm of the driven shaft 13, to the control unit 16.

In the embodiment shown in FIG. 2a the control unit 16 has two outputs A and B, which can be connected via a changeover switch 17 to a magnetic valve 18 which is connected in a line 20 between a compressed air source (not shown) and a pilot valve 19 for controlling the same. The pilot valve, which for the purpose of clarity is shown in enlargement in FIG. 2b, guides via two outflows 21 and 22 in the cylinder wall 23 the compressed air to one or the other of the cylinder spaces 4 or 5. For this purpose the pilot valve 19 has a long valve body 24 which is displaceable in the valve housing. In the valve housing there is also a spring 25 which acts to move the valve body to the right in the Figure, as well as a casing 26 which surrounds the spring 25, which forms a stop surface for the valve body 24 at its left-hand end position. The valve has an inlet 28 for connection to the source of compressed air. There is also an outlet 29 for removing air as well as an inlet 30, to which the conduit 20 is connected.

In the position of the valve body 24 shown the cylinder space 4 is connected to the compressed air source via the inlet 28 and the inlet 21 in the cylinder wall 23. The space 5 is purged via the inlet 22, an axial bore 31 and radial bores 32 in the valve body 24.

The pressure in the conduit 20 thus regulates the setting of the pilot valve 19 while the compressed air for operating of the piston 6 is supplied from the compressed air source via a conduit 34 connected to the valve inlet 28. A stop valve is coupled into the conduit 34 and is indicated by 35. This is disposed to open the connection between the compressed air source and the inlet 28 only when the gear lever 33 is in the neutral position. This can be accomplished mechanically by a cam means 36, which is connected to the gear lever 33 (indicated by the dashed line) and which when the lever is moved from a gear position to the neutral position opens the valve 35.

The function of the arrangement is the following:

When the vehicle starts in first gear the gear lever, indicated schematically by 33, is in the position indicated by 1 and 5, the change-over switch 17, which is controlled by the lateral movement in the neutral position (indicated by the dashed lines) of the gear lever is coupled to the output A of the control unit 16. The sensor 15 gives a current of low frequency to the control unit 16. The control unit is adapted to keep the output A live up to a frequency corresponding to, for example, 350 rpm of the driven shaft 13 and outlet B live up to a frequency corresponding to, for example 700 rpm. These values are only examples and can vary according to the engine, type of vehicle, etc. In driving in first gear the rpm is in all circumstances too low to break the current to output A, as well as when driving in second gear. In this position the magnetic valve 18 is current-carrying and thus open and the valve body 24 of the pilot valve 19 is kept in the left-hand position by the air pressure so that the space 4 of the piston-cylinder arrangement 3 is connected to the pressure source, so that the lower gear of the range box 2 is engaged.

In the present example it is assumed that 350 rpm for the driven shaft 13 lies within the rpm range for third gear, preferably half-way between the upper and lower rpm limits for third gear. However, when the shift has been completed to third the change-over switch 17 is connected to output B of the control unit, which is live up to 700 rpm of the driven shaft 13, which means that the magnetic valve is still open when the current is cut off to output A when the rpm exceeds 350. 700 rpm is assumed here to lie between the upper and lower rpm limits for fifth gear.

When fifth gear is to be engaged the gear lever 33 is moved to the position for first gear, and the change-over switch 17, when the gear lever passes through the neutral position couples over to the now currentless output A of the control unit 16. This cuts off the current to the magnetic valve 18, which closes the connection between the pressure source and the pilot valve 19 via the conduit 20. The force of the spring 25 moves the valve body 24 to the right-hand end position, thereby establishing the connection between the pressure source and the cylinder space 5 so that the piston 6 is moved to the left at the same time as the space 4 is evacuated. This engages the higher gear of the range box, so that when the gear lever is in the position for first gear, fifth gear is engaged instead. In continued up-shifting there is no change in the range, since 700 rpm is within the rpm range of fifth gear and the output B is therefore currentless in the shifting from sixth to seventh gear. In downshifting the process is reversed. The changing of the position of the valve body 24 is achieved by means of the air pressure in the conduit 20 when the magnetic valve 18 is opened.

FIG. 3 shows an embodiment of the invention, which has two magnetic valves 40 and 41 instead of a pilot valve 19, which regulate the supply of compressed air directly to the cylinder spaces 4 and 5, respectively, in the piston-cylinder arrangement 3 via conduits 40a and 41a. The sensor 15 is coupled to a control unit 42 with four outputs A1, A2, B1 and B2, divided into two groups, of which the first output (A1 and B1) in each group controls the current over a first two position change-over switch 43 to one magnetic valve 41 and the other outputs A2 and B2 control the current via a second two position change-over switch 44 to the second magnitude valve 40. As in the preceding example the change-over switches 43 and 44 are controlled by the lateral movement of the gear lever 33 in the neutral position, which is indicated by the dashed lines. In this embodiment, instead of the stop valve 35 in FIG. 2a, there is a switch 45, which, as is shown schematically in the Figure, only completes the circuit to the control unit 42 when the gear lever 33 is in the neutral position. The control unit 42 is adapted to close the circuit to output A1 and break the circuit to output A2, when the rpm of the driven shaft 13 lies below a certain lower value, e.g., 350 rpm as in the preceding example. When said rpm value is exceeded the circuit to A1 is broken and the circuit to A2 is closed. This is illustrated schematically with the help of the change-over switch 46 in the control unit. A corresponding process occurs with the outputs B1 and B2, but at a higher rpm, e.g., 700 rpm as in the preceding example, and is illustrated schematically with the help of the change-over switch 47 in the control unit 42.

The functioning of the arrangement is as follows:

It is assumed that the vehicle is stationary with the gear lever 33 in the neutral position. The circuit is then closed to the control unit 42 by means of the switch 45. When the first gear is engaged the outputs A1 and A2 are connected via the change-over switches 43 and 44 to the magnetic valves 40 and 41. Since the rpm of the driven shaft 13 falls below 350 rpm the output A1 is live and the output A2 is currentless. This means that the valve 41 opens, while the valve 40 is still closed. Compressed air is supplied to the cylinder space 4 and the piston is brought to the position shown, in which the lower gear of the range box 2 is engaged. When the lever is shifted up to second and then to third outputs B1 and B2 are engaged, but since the rpm in third falls below 700 rpm the output B1 is live and B2 currentless. Therefore there is no shifting in the range box. When the revolutions exceed 350 rpm then the circuit is broken to the output A1 and is closed to A2. However, this has no effect on the range box as long as the B outputs are engaged when driving in third and fourth. Only when shifting to fifth, i.e., when lever 33 is moved to first gear is there a shift in the range position. Then the A-outputs are engaged and the magnetic valve 40 is opened by the circuit being closed over output A2, which is now live, while the valve 41 closes, since the output A1 is currentless. With the valve 40 open compressed air is supplied to the cylinder space 5 at the same time as cylinder space 4 is purged via the valve 41, shifting up occurring by the piston 6 moving to the left in the Figure. When one later shifts from sixth to seventh and the B outputs are engaged there is no change in the range box since 700 rpm had already been exceeded in fifth gear and B2 is therefore live, while B1 is currentless.

To assure that the shifting in the range box is done while the gear lever is in the neutral position or the clutch pedal is depressed, it is suitable to dispose a device between the gear lever and the change-over switch 17 or between the change-over switches 43 and 44, which acts on the change-over switches at the initial movement of the gear lever through the neutral position. FIG. 4 shows an embodiment of such a device, generally designated by 50. It consists of a pad 51 with a central bore 52, through which a shaft portion 53 extends. The shaft portion 53 is an extension of a shaft in the gear mechanism in the gear box, which is displaced by the gear lever when it is moved laterally in the neutral position. The shaft portion 53 is journalled on two bearings 54 so as to be axially displaceable, said bearings forming at the same time the end stop surfaces for the pad 51 which engages the shaft portion 53 by friction. The frictional grip is achieved by means of a spring 55, in a casing 56 in a hole in the pad and presses against the shaft portion 53. The spring 55 is held pretensed in place by means of a plug 57 screwed into the outer end of the casing 56. FIG. 4 shows the pad 51 engaged with the two change-over switches 43 and 44 in the form of micro-switches. The distance between the stop surfaces 54 is adapted so that the pad can only be moved the distance required to switch over the micro-switches 43 and 44. This distance, designated S, is only a small portion of the total displacement of the shaft portion 53 in shifting gears between, for example, second and third. By this arrangement the changing over of the two micro-switches occurs after a very small movement of the gear lever, which corresponds to a displacement of the shaft portion 53 a distance S. The shaft portion 53 is displaced relative to the pad 51 when the gear lever is moved further.

What I claim is:

1. In a gear box comprising a main gear box with a number of gear ratios, and a two-geared range gear box coupled to a driven shaft of the main gear box, said range gear box having such gear ratios that the total gear ratio of the gear box with the higher ratio in the range box and the lowest ratio in the main box is higher than that with the lower ratio in the range gear box and the highest ratio in the main gear box, and an arrangement for controlling the shifting between two gear ratio ranges, said arrangement comprising a servo-aggregate which is connected to the gear-driving mechanism of the range gear box and which is coordinated with means which start operation of the servo-aggregate only upon shifting in the main gear box, as well as a sensor device which coacts with the driven shaft of the range gear box for reading the rpm of the shaft; the improvement in which said sensor device is connected to a control unit having at least two outputs over which the control unit provides a signal for maneuvering the servo-aggregate during shifting in the main gear box for shifting in the range gear box, said control unit providing a signal over the first output when the rpm of the driven shaft passes a first low rpm while increasing or decreasing, and over the second output when the rpm passes a second, greater rpm while increasing or decreasing, at least one of a plurality of two-position changeover switches adjusted by the lateral movement of a gear lever in the neutral position being connected between the two outputs for shifting an operating output of the gear box.

2. A gear box according to claim 1, characterized in that the servo-aggregate is formed of a fluid-operated piston-cylinder arrangement and that the control unit is electrically connected to at least one magnetic valve controlling a supply of pressure medium to the piston-cylinder arrangement, the control unit being adapted to open or close the magnetic valve depending on the rpm sensed by the sensor device.

3. A gear box according to claim 2, characterized in that the magnetic valve controls the setting of a pilot valve coupled to the connection between the pressure source and a double-acting piston-cylinder arrangement, so that when the pilot valve is in one position pressure medium is introduced into the cylinder space on one side of the piston and when said pilot valve is in the other position the pressure medium is introduced into the cylinder space on the opposite side of the piston.

4. A gear box according to claim 3, characterized in that the control unit has four outputs divided into two groups, the first output in each group is connected via a two-position position changeover switch changeable by the lateral movement of the gear lever in the neutral position, to a first magnetic valve and the second output is connected over a corresponding second two-position changeover switch to a second magnetic valve, said magnetic valves controlling the supply of pressure medium to their individual cylinder spaces in a double-acting piston-cylinder arrangement, the control unit controlling the operating current, via the first group of outputs through changing the active output, for changing over of the magnetic valves when the rpm of the driven shaft passes a first low rpm and via the second group of outputs by changing the active output when the rpm passes a second higher rpm.

5. A gear box according to claim 2, characterized in that the changeover switch can be switched by means of a member displaceable in the transverse direction of the gear box, said member frictionally engaging a part of the shifting mechanism of the main gear box, which is movable when the gear lever is moved laterally in the neutral position, the lateral switching movement of the member being restricted by two stop surfaces to a portion of the transverse movement of the part which engages the member so that the member is pulled along by friction during the initial movement of the part, while the part is displaced relative to said member during continued movement.

6. A gear box according to claim 4, characterized in that the changeover switches can be switched by means of a member displaceable in the transverse direction of the gear box, said member frictionally engaging a part of the shifting mechanism of the main gear box, which is movable when the gear lever is moved laterally in the neutral position, the lateral switching movement of the member being restricted by two stop surfaces to a portion of the transverse movement of the part which engages the member so that the member is pulled along by friction during the initial movement of the part, while the part is displaced relative to said member during continued movement.

* * * * *